United States Patent
Nogai et al.

(10) Patent No.: US 9,725,536 B2
(45) Date of Patent: Aug. 8, 2017

(54) STERICALLY DEMANDING DIALKOKXYDIALKYLSILANES AS EXTERNAL DONORS FOR ZIEGLER CATALYSTS FOR THE POLYMERIZATION OF PROPYLENE

(71) Applicant: Lummus Novolen Technology GmbH, Mannheim (DE)

(72) Inventors: Stefan Nogai, Heidelberg (DE); Andreas Winter, Neuleininger (DE); Yvonne Denkwitz, Mannheim (DE); Oliver Schuster, Weinheim (DE)

(73) Assignee: Lummus Novolen Technology GmbH, Mannheim (DE)

( * ) Notice: Subject to any disclaimer, the term of this patent is extended or adjusted under 35 U.S.C. 154(b) by 0 days.

(21) Appl. No.: 14/411,061

(22) PCT Filed: Jun. 14, 2013

(86) PCT No.: PCT/EP2013/062433
§ 371 (c)(1),
(2) Date: Dec. 23, 2014

(87) PCT Pub. No.: WO2014/001108
PCT Pub. Date: Jan. 3, 2014

(65) Prior Publication Data
US 2015/0152202 A1 Jun. 4, 2015

(30) Foreign Application Priority Data
Jun. 28, 2012 (EP) ..................... 12174212

(51) Int. Cl.
*C08F 110/06* (2006.01)
*C08F 10/06* (2006.01)

(52) U.S. Cl.
CPC ............ *C08F 110/06* (2013.01); *C08F 10/06* (2013.01)

(58) Field of Classification Search
None
See application file for complete search history.

(56) References Cited

U.S. PATENT DOCUMENTS

| 4,376,062 A | 3/1983 | Hamer et al. |
| 4,379,758 A | 4/1983 | Wagner et al. |

(Continued)

FOREIGN PATENT DOCUMENTS

| CN | 1105671 A | 7/1995 |
| CN | 1236372 A | 11/1999 |

(Continued)

OTHER PUBLICATIONS

International Search Report and Written Opinion issued in PCT/EP2013/062433 mailed on Aug. 1, 2013 (8 pages).

(Continued)

*Primary Examiner* — Catherine S Branch
(74) *Attorney, Agent, or Firm* — Osha Liang LLP (57) ABSTRACT

A process for the polymerization of propylene is disclosed. The process may include contacting, in a gas phase polymerization reactor, propylene and optionally one or more comonomers with a catalyst system comprising a Ziegler-Natta catalyst and an external electron donor system comprising di(bicyclo[2.2.1]heptan-2-yl)dimethoxysilane.

9 Claims, 3 Drawing Sheets

(56) References Cited

U.S. PATENT DOCUMENTS

| | | | |
|---|---|---|---|
| 4,829,038 | A | 5/1989 | Hoppin et al. |
| 4,861,847 | A | 8/1989 | Mao et al. |
| 4,990,479 | A | 2/1991 | Ishimaru et al. |
| 5,066,737 | A | 11/1991 | Job |
| 5,438,110 | A | 8/1995 | Ishimaru et al. |
| 5,639,822 | A | 6/1997 | Hungenberg et al. |
| 6,235,854 | B1 | 5/2001 | Kioka et al. |
| 6,323,298 | B1 | 11/2001 | Yanagihara et al. |
| 6,683,017 | B2 | 1/2004 | Gao et al. |
| 6,831,032 | B2 | 12/2004 | Spaether |
| 7,022,795 | B1 | 4/2006 | Huffer et al. |
| 7,071,137 | B2 | 7/2006 | Klendworth et al. |
| 7,329,626 | B2 | 2/2008 | Spaether et al. |
| 7,947,788 | B2 | 5/2011 | Ramjoie et al. |
| 2007/0208147 | A1* | 9/2007 | Lee .................. C08F 10/06 526/125.3 |
| 2009/0171042 | A1 | 7/2009 | Denifl et al. |
| 2010/0069586 | A1 | 3/2010 | Klendworth et al. |
| 2010/0222530 | A1* | 9/2010 | Chen .................. C08F 110/06 526/135 |
| 2011/0152424 | A1 | 6/2011 | Cai et al. |

FOREIGN PATENT DOCUMENTS

| | | |
|---|---|---|
| CN | 1292800 A | 4/2001 |
| EP | 0086473 A2 | 8/1983 |
| EP | 0125911 A1 | 11/1984 |
| EP | 0 263 718 A2 | 4/1988 |
| EP | 0299712 A2 | 1/1989 |
| EP | 0361493 A1 | 4/1990 |
| EP | 0361494 A2 | 4/1990 |
| EP | 0602922 A2 | 6/1994 |
| EP | 0728724 A1 | 8/1996 |
| EP | 0728769 A1 | 8/1996 |
| EP | 0850889 A1 | 7/1998 |
| JP | S6392615 A | 4/1988 |
| JP | 2521676 B2 | 8/1996 |
| KR | 20090026462 A | 3/2009 |
| WO | 97/30096 A2 | 8/1997 |
| WO | 2010144080 A1 | 12/2010 |

OTHER PUBLICATIONS

Correspondence reporting an Official Action issued Dec. 17, 2015 in corresponding Colombian application No. 14-275.138 (9 pages).
First Office Action issued Dec. 29, 2015 in corresponding Chinese application No. 201380033900.X (w/translation) (18 pages).
Notification of Reasons for Rejection issued Dec. 8, 2015 in corresponding Japanese application No. 2015-518967 (w/translation) (9 pages).
Examination Report issued in corresponding Singaporean Application No. 11201408604Q dated Jun. 30, 2016 (3 pages).
Office Action issued Jun. 17, 2016 in corresponding Columbian application No. 14-275138 (6 pages).
Office Action issued May 17, 2016 in corresponding Korean application No. 10-2014-7035892 (w/translation) (10 pages).

* cited by examiner

STERICALLY DEMANDING DIALKOKXYDIALKYLSILANES AS EXTERNAL DONORS FOR ZIEGLER CATALYSTS FOR THE POLYMERIZATION OF PROPYLENE

FIELD OF THE DISCLOSURE

Embodiments disclosed herein relate generally to polymerization of propylene via Ziegler-Natta catalysis with an external donor system. More specifically, embodiments disclosed herein relate to dialkoxydialkylsilanes with sterically demanding alkyl substituents, their synthesis, and their use in the polymerization of propylene.

BACKGROUND

External donors are used together with Ziegler catalysts in the polymerization of propylene for influencing the properties of the final product. For example, external donors may be used to influence or control the molecular weight ($M_n$, $M_w$, $M_z$, MWD), tacticity, the amount of xylene soluble material in the polymer, and other parameters of the product.

One example of an external donor used in the polymerization of propylene is silanes. For example, US20110152424 discloses use of a methyl(cyclohexyl)dimethoxysilane (C-Donor) electron donor system. Various other dialkoxydialkylsilanes such as diisopropyldimethoxysilane (P-Donor, EP0850889 and U.S. Pat. No. 4,829,038) isobutyl(isopropyl)dimethoxysilane (BUPS, EP0850889 and U.S. Pat. No. 4,829,038) and dicyclopentyldimethoxysilane (D-Donor, U.S. Pat. No. 4,990,479 and U.S. Pat. No. 5,438,110) have also been used as external donors (illustration below).

Figure 3:
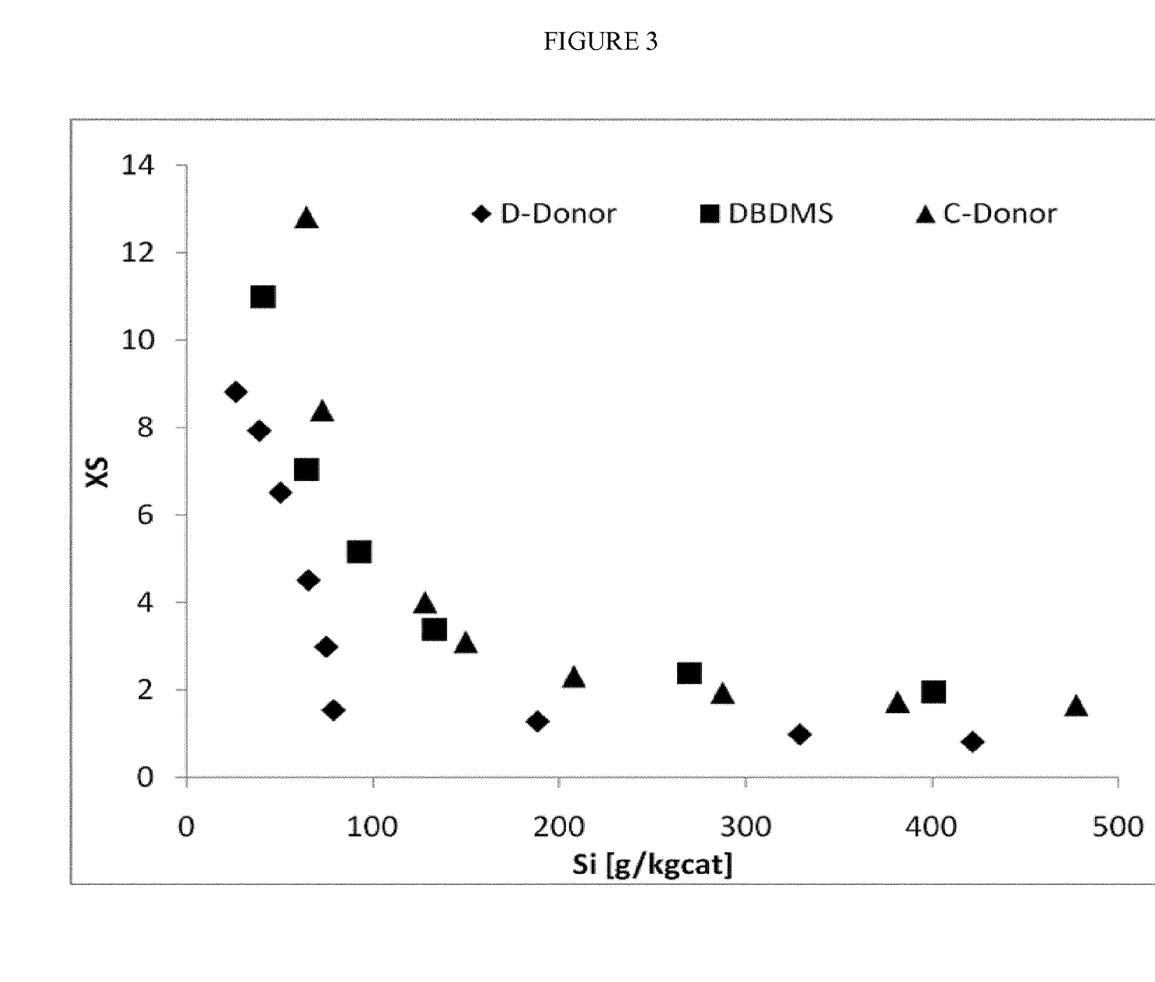
FIG. 3 shows a comparison of the silane response of C-Donor, D-Donor and DBDMS.

The C-Donor is known in the art to produce a fair amount of xylene solubles (XS). It allows to adjust the XS from about 1 to 5 wt % due to a moderate silane response. As used herein, the term "silane response" refers to the response of the XS to variable amounts of silane. It is represented by the m(silane)-XS plot (FIG. 3). It is understood by one skilled in the art, that a steep silane response does not allow a reliable and constant XS output on the industrial scale. Therefore a more smoother response as seen in the C-Donor is beneficial.

In the art hydrogen is used to control the melt flow index (MFR) of the polymer. In addition to the MFR, also the productivity of the catalyst system is influenced. The productivity of a given system must therefore be regarded in relation to the MFR produced. With the C-donor, very low productivites are observed at low MFR.

Bulky silanes, such as BUPS, P-donor and D-donor, offer good activities at low MFR. However, this group of silanes produces very low XS (<1). Combined with a steep silane response (FIG. 3), the XS cannot be adjusted reliably using these donors.

Thus, there continues to be a need for catalyst systems and donors which produce polypropylene with low MFR and high XS at good productivities. Such polymers exhibit high stiffness combined with good processability in applications such as pipe, sheet, raffia, film, blow molding, injection stretch blow molding or thermoforming Furthermore, the synthesis of bulky silanes usually proves to be difficult and expensive. For example, BUPS is synthesised from expensive organometallic reagents. The popular D-Donor can be afforded through the more economical hydrosilylation route, but additional activators need to be utilised (e.g. EP0602922).

Thus, there continues to be a need for facile and economic routes to bulky silanes.

Bulky polycyclic alkyl substituents, such as bicyclo[2.2.1]heptan-2-yl derivatives, have been used in dialkoxydialkylsilanes earlier. In JP2521676 and EP0299712 bicyclo[2.2.1]heptan-2-yldimethoxy(methyl)silane (BDMMS) and bicyclo[2.2.1]heptan-2-yltrimethoxysilane (BTMS) have been disclosed.

SUMMARY OF THE DISCLOSURE

It has been found that certain dialkoxydialkylsilanes with sterically demanding alkyl substituents allow for efficient production of polypropylenes having a particularly wide range of MFR-XS combinations. It was surprisingly found that such bulky external donors allow good productivity in domains that are difficult to access with state-of-the art silanes, namely polymers that combine low MFR with high XS (xylene solubles).

Embodiments disclosed herein describe the facile synthesis of these dialkoxydialkylsilanes with sterically demanding alkyl substituents and their use in the polymerization of propylene. For example, methods for forming a dialkoxydialkylsilane with sterically demanding alkyl substituents, the method may include: mixing a strerically demanding alkyl substituent with a hydrosilylation catalyst; heating the mixture to a temperature in the range from about 40° C. to about 80° C.; and introducing dihalosilane to the heated mixture to react the dihalosilane with the sterically demanding alkyl substituent to form a dialkoxydialkylsilane with sterically demanding alkyl substituents In one aspect, embodiments disclosed herein relate to a catalyst system useful for the polymerization of propylene. The catalyst system may include a Ziegler-Natta catalyst, a co-catalyst, and at least one external electron donor comprising a dialkoxydialkylsilane with sterically demanding alkyl substituents. In particular embodiments, the dialkoxydialkylsilane with sterically demanding alkyl substituents may comprise di(bicyclo[2.2.1]heptan-2-yl)dimethoxysilane.

In another aspect, embodiments disclosed herein relate to a process for polymerizing propylene. The process may include contacting, in a gas phase polymerization reactor, propylene and optionally one or more comonomers with a catalyst system comprising a Ziegler-Natta catalyst and an external electron donor system comprising a dialkoxydialkylsilane with sterically demanding alkyl substituents, such as di(bicyclo[2.2.1]heptan-2-yl)dimethoxysilane. The propylene polymer produced by such gas phase polymerization process may have a molecular weight distribution in the range from about 4 to less than 5. In some embodiments, the external donor system may also include at least one external donor selected from the group consisting of dimethyldimethoxysilane, methyltrimethoxysilane, tetramethoxysilane or dicyclopentyldimethoxysilane. Such polymers may be used for pipe, sheet, raffia, axially or biaxially-oriented film, blow molding, injection stretch blow molding or thermoforming applications. In some embodiments, the catalyst systems may be used to produce a propylene polymer having a MFR of less than 10 dg/min and xylene solubles equal to or greater than 1 wt %.

Further aspects and advantages will be apparent from the following description and the appended claims.

DETAILED DESCRIPTION

In one aspect, embodiments disclosed herein relate generally to polymerization of propylene via Ziegler-Natta catalysis with an external donor system. More specifically, embodiments disclosed herein relate to dialkoxydialkylsilanes with sterically demanding alkyl substituents, their synthesis, and their use in the polymerization of propylene.

As used herein, "sterically demanding alkyl substituents" refers to bulky alkyl substituents that, due to their proximity to the silicon centers, influence, limit, or tailor the interaction of the external donor, the Ziegler-Natta catalyst, and propylene or other comonomers during the polymerization process. Examples of bulky substituents may include groups with significant branching, preferably α-branched hydrocarbon groups, cyclic hydrocarbon groups, and others.

Silane donors useful in embodiments herein may be represented by the following general structure:

wherein $R_1$ and $R_2$ are the same or different and are selected from the group consisting of a saturated or unsaturated aliphatic group of from 5 to about 20 carbon atoms, including without limitation bridged and/or polycyclic isomers. $R_3$ and $R_4$ are the same or different and are selected from the group consisting of a hydrogen atom or a saturated or unsaturated aliphatic group of from 1 to about 20 carbon atoms. $R_x$ and $R_y$ are the same or different and are selected from the group consisting of a saturated or unsaturated aliphatic group of from 1 to about 20 carbon atoms or an aryl group of from 6 to about 20 carbon atoms, preferably a saturated or unsaturated aliphatic group of from 1 to about 20 carbon atoms, more preferably an alkyl group of from 1 to about 10 carbon atoms, even more preferably an alkyl group of from 1 to 4 carbon atoms, ideally a methyl group.

In a preferred variation of this embodiment $R_1$ and $R_2$ are the same or different and are selected from the group consisting of a saturated or unsaturated aliphatic group of from 6 to about 15 carbon atoms, including without limitation bridged and/or polycyclic isomers. $R_3$ and $R_4$ are the same or different and are selected from the group consisting of a hydrogen atom or a saturated or unsaturated aliphatic group of from 1 to about 20 carbon atoms. $R_x$ and $R_y$ are the same or different and are selected from the group consisting of a saturated or unsaturated aliphatic group of from 1 to about 20 carbon atoms, preferably an alkyl group of from 1 to about 10 carbon atoms, more preferably an alkyl group of from 1 to 4 carbon atoms, ideally a methyl group.

In a more preferred variation of this embodiment $R_1$ and $R_2$ are the same or different and are selected from the group consisting of a saturated or unsaturated aliphatic group of from 6 to about 15 carbon atoms, including without limitation bridged and/or polycyclic isomers. $R_3$ and $R_4$ are the same and are a hydrogen atom. $R_x$ and $R_y$ are the same or different and are selected from the group consisting of an alkyl group of from 1 to about 10 carbon atoms, preferably an alkyl group of from 1 to 4 carbon atoms, ideally a methyl group.

In an even more preferred variation of this embodiment $R_1$ and $R_2$ are the same and are selected from the group consisting of a saturated or unsaturated aliphatic group of from 6 to about 15 carbon atoms. This group is preferably part of a bridged and/or polycyclic, even more preferred bicyclic, group. $R_3$ and $R_4$ are the same and are a hydrogen atom. $R_x$ and $R_y$ are the same and are selected from the group consisting an alkyl group of from 1 to 4 carbon atoms, preferably 1 to 2, ideally a methyl group.

In a most preferred variation of this embodiment $R_1$ and $R_2$ are the same and are selected from the group consisting of a saturated or unsaturated aliphatic group of from 6 to about 15 carbon atoms. This group is preferably part of a bridged and/or polycyclic, even more preferred bicyclic, group. $R_3$ and $R_4$ are the same and are a hydrogen atom. $R_x$ and $R_y$ are the same and are selected from the group consisting of an alkyl group of from 1 to 4 carbon atoms, preferably 1 to 2, ideally a methyl group.

In an ideal variation of this embodiment silanes are selected from those illustrated below. $R_x$ and $R_y$ are the same and are selected from the group consisting of an alkyl group of from 1 to 4 carbon atoms, preferably 1 to 2, ideally a methyl group.

Various dialkoxydialkylsilanes according to embodiments disclosed herein are represented by the following structures, where $R_x$ and $R_y$ may be as defined above.

-continued

In some embodiments, the silane donor is di(bicyclo[2.2.1]heptan-2-yl)dimethoxysilane. In other embodiments, the silane donor may include di(bicyclo[2.2.1]heptan-2-yl)dimethoxysilane and at least one external donor selected from the group consisting of dimethyldimethoxysilane, methyltrimethoxysilane, tetramethoxysilane or dicyclopentyldimethoxysilane.

It is understood by one skilled in the art that one or more isomers of the given examples are possible.

Silane donors useful in embodiments herein may be synthesised via a hydrosilylation route. Bridged and/or polycyclic alkenes readily react, due to the ring tension, with dihydridosilanes in the presence of a hydrosilylation catalyst. As an example, a dialkoxydialkylsilane with sterically demanding alkyl substituents may be formed by a method including the following steps: mixing a strerically demanding alkyl substituent with a hydrosilylation catalyst; heating the mixture to a temperature in the range from about 40° C. to about 80° C.; and introducing dihalosilane to the heated mixture to react the dihalosilane with the sterically demanding alkyl substituent to form a dialkoxydialkylsilane with sterically demanding alkyl substituents. The dihalosilane may be introduced at a rate sufficient to maintain an internal temperature of the reaction mixture substantially constant.

Useful catalysts comprise elements and compounds of rhodium, palladium and, in particular, platinum. Preferred rhodium complexes are $RhCl_3/PPh_3$ (excess), $(PPh_3)_3RhCl$ (Wilkinson Catalyst) and $(PPh_3)_3HRh(CO)$. Platinum catalysts are, for instance, solutions of hexachloroplatinic acid $(H_2PtCl_6.6H_2O)$ in alcohols such as isopropanol (Speier catalyst), olefin complexes such as the Karstedt catalyst $(Pt(ViMe_2SiOSiMe_2Vi)_3)$ or phosphine complexes such as $(PPh_3)_3PtCl_2$. Platinum can also be deposited on solid support materials such as activated carbon, aluminium oxide or silica gel. The preferred hydrosilylation catalyst is hexachloroplatinic acid/isopropanol.

Due to an exothermic energy profile, it is advisable to meter in at least one component during the reaction and thus control the internal temperature. To avoid the danger of accumulation of reaction energy, starting conditions such as temperature preferably allow for a spontaneous reaction.

It is understood that bridged, bicyclic substituents may be attached in two ways to the silicon atom (i.e., endo or exo) and that one or more combinations are possible for the given examples. Furthermore it is understood that two or more chiral atoms in one molecule will allow for the formation of different diastereomers.

Figure 1:
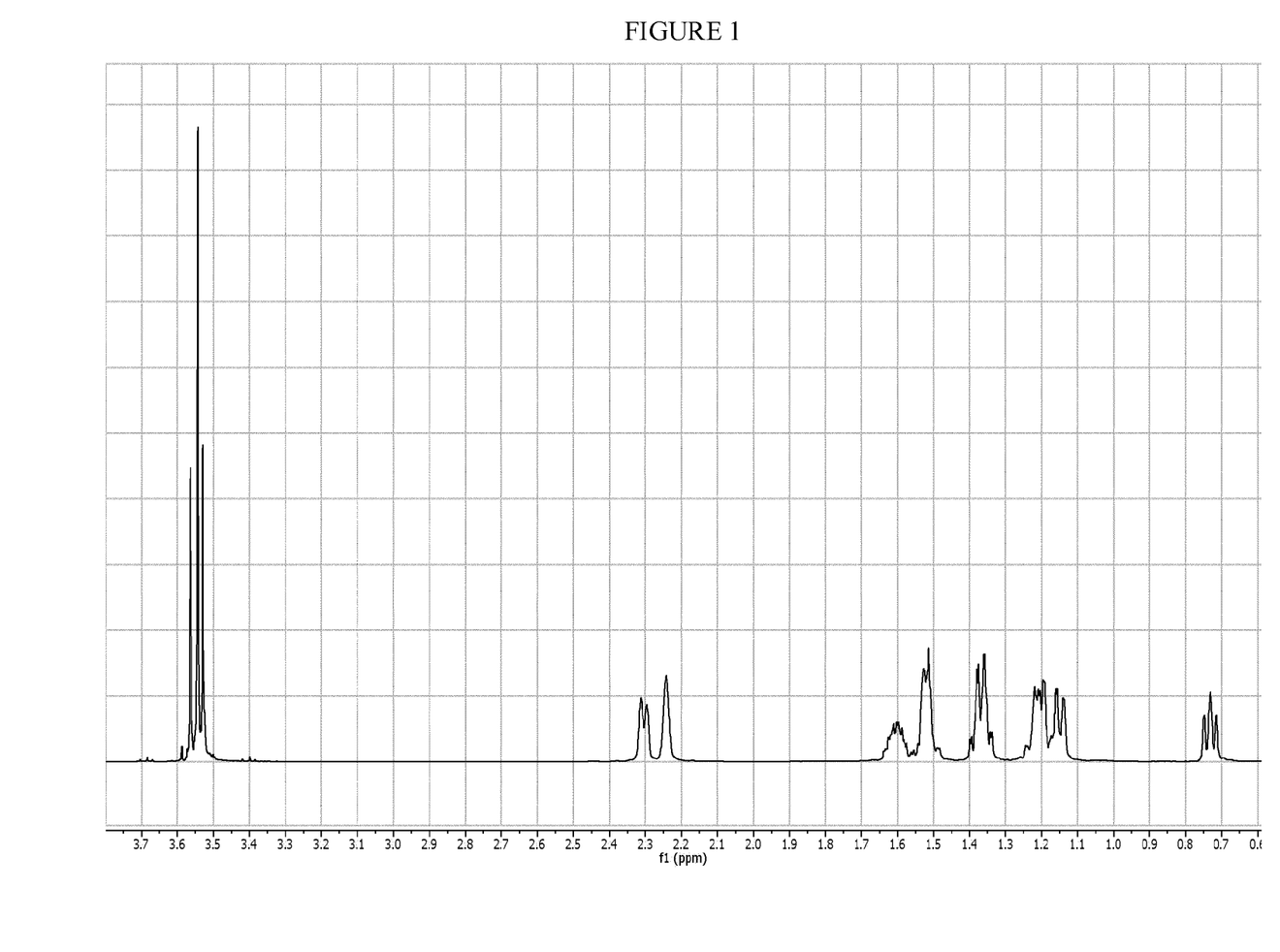
FIG. 1 illustrates a $^1$H-NMR spectrum of di(bicyclo[2.2.1]heptan-2-yl)dimethoxysilane (DBDMS).
Figure 2:
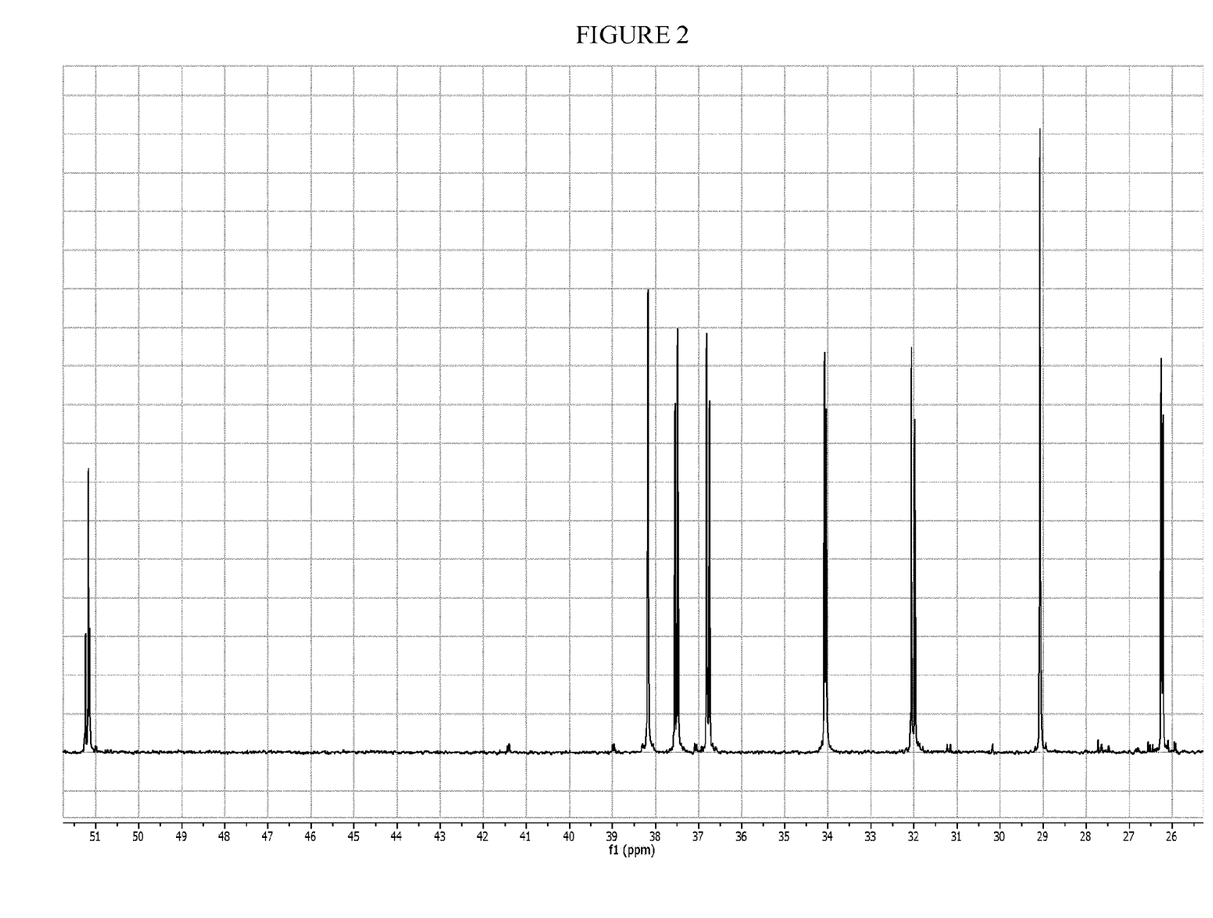
FIG. 2 illustrates a $^{13}$C-NMR spectrum of DBDMS.

Mixtures of such isomers will be useful in the practice of the embodiment of this invention. For example, mixtures with an isomer distribution giving rise to the NMR spectra in FIGS. 1 and 2 are preferred. It is understood that reaction conditions during hydrosilylation, such as the nature of the catalyst, will allow tailoring of the isomer distribution. Isomers may also be blended after synthesis.

Furthermore mixtures with other known external donors such as silanes (e.g. Tetraethoxysilane, D-Donor, C-Donor, BUPS, P-Donor), ethers (e.g. 2,2-diisobutyl-1,3-dimethoxypropane), esters (e.g. aromatic carboxylic esters), hindered amines and similar compounds can be utilised.

Catalyst systems useful for the polymerization of propylene and propylene interpolymers according to embodiments disclosed herein may be formed by mixing a Ziegler-Natta catalyst, a co-catalyst, and the above-described dialkoxydialkylsilanes with sterically demanding alkyl substituents. For example, catalyst systems useful for the polymerization of propylene and propylene interpolymers according to embodiments disclosed herein may be formed by mixing a Ziegler-Natta catalyst, a co-catalyst, and an external electron donor system comprising di(bicyclo[2.2.1]heptan-2-yl)dimethoxysilane.

Ziegler-Natta catalysts for use in the catalyst systems, including titanium-based catalysts, are described or referenced in U.S. Pat. No. 4,376,062, U.S. Pat. No. 4,379,758, U.S. Pat. No. 5,066,737, U.S. Pat. No. 7,329,626, U.S. Pat. No. 5,639,822, U.S. Pat. No. 7,071,137, U.S. Pat. No. 7,022,795, U.S. Pat. No. 6,831,032, US2010069586, US2009171042, WO2010144080, EP0361494, EP0728769, U.S. Pat. No. 4,861,847, U.S. Pat. No. 6,235,854, U.S. Pat. No. 6,323,298, and U.S. Pat. No. 6,683,017, among others. Ziegler-Natta catalysts typically are magnesium/titanium/internal donor complexes, optionally supported on a suitable support like silica.

Such internal donors may be diether (EP728769, EP0361494, EP0361493, EP0728724, U.S. Pat. No. 6,683,017), succinate (EP0125911, EP0263718, EP0086473), malonate (CN1236372, CN1292800), 1,3-diketone (CN1105671) and phthalate (U.S. Pat. No. 7,329,626, US2010069586), among others.

Catalyst systems herein may include an aluminum compound as co-catalyst. Examples of suitable aluminum compounds include aluminum trialkyls and derivatives thereof wherein an alkyl group is substituted by an alkoxy group or a halogen atom, e.g. chlorine or bromine atom. The alkyl groups may be the same or different. The alkyl groups may be linear or branched chain alkyl groups. For example, trialkylaluminum compounds are those wherein the alkyl groups each have 1 to 8 carbon atoms, such as trimethylaluminum, triethylaluminum, tri-isobutylaluminum, trioctylaluminum or methyldiethylaluminum may be useful in embodiments disclosed herein.

To prepare the catalyst system, the aluminum compound as co-catalyst and the dialkoxydialkylsilanes with sterically demanding alkyl substituents may be contacted with the Ziegler-Natta catalyst component separately in any order or mixed together, normally at a temperature in the range of from about 0° C. to 200° C., such as from about 20° C. to about 90° C. and a pressure of from about 1 to about 100 bar, such as from about 1 to about 40 bar.

The aluminum compound co-catalyst may be added in such an amount that the atomic ratio of the aluminum compound to the transition metal of the solid catalytic component is in the range from about 10:1 to about 800:1, such as from about 20:1 to about 200:1.

The catalyst systems may be advantageously used in the polymerization of alk-1-enes. Suitable alk-1-enes include linear or branched $C_2$-$C_{10}$ alkenes, in particular linear $C_2$-$C_{10}$ alk-1-enes such as ethylene, propylene, but-1-ene, pent-1-ene, hex-1-ene, hept-1-ene, oct-1-ene non-1-ene, dec-1-ene or 4-methylpent-1-ene. Mixtures of these alk-1-enes may be polymerized as well.

The catalyst systems may be used, for example, in a gas phase polymerization reactor for the production of propylene polymers, both homopolymers of propylene as well as copolymers of propylene and one or more further alk-1-enes having up to 10 carbon atoms. The term "copolymers" as used herein also refers to copolymers wherein the further alk-1-ene having up to 10 carbon atoms is incorporated randomly. In these copolymers, in general the comonomer content is less than about 15% by weight. The copolymers may also be in the form of so-called block or impact copolymers, which in general comprise at least a matrix of a propylene homopolymer or propylene random copolymer containing less than 15% by weight of a further alk-1-ene having up to 10 carbon atoms and a soft phase of a propylene copolymer containing 10% to 80% by weight of further alk-1-enes having up to 10 carbon atoms. Also, mixtures of comonomers are contemplated, resulting in, for example, terpolymers of propylene.

The production of the propylene polymers may be carried out in any gas phase reactor suitable for the polymerization of alk-1-enes, either batchwise, semi-continuously, or continuously, such as in fluidized bed reactors or horizontal or vertical stirred powder bed reactors. It will be understood that the polymerization may be carried out in a series of consecutively coupled reactors. The reaction time depends on the chosen reaction conditions. In general, the reaction time is from about 0.2 to about 20 hours, usually from about 0.5 to about 10 hours.

In general the polymerization is carried out at a temperature in the range of from about 20° C. to about 150° C., such as from about 50° C. to about 120° C., or from about 60° C. to about 90° C., and a pressure in the range of from about 1 to 100 bar, such as from about 15 to about 60 bar, or from about 20 to about 45 bar.

The molecular weight of the resulting polymers may be controlled and adjusted over a wide range by adding polymer chain transfer or chain termination inducing agents as commonly used in the art of polymerization, such as hydrogen. In addition an inert solvent, such as toluene or hexane, or an inert gas, such as nitrogen or argon, an antistatic agent, and smaller amounts of a powdered polymer, e.g., polypropylene powder may be added.

The (weight) average molecular weights of the propylene polymers that may be produced by using the catalyst system herein in general are in the range of from about 10,000 to 1,000,000 g/mole and the melt flow rates are in the range of from about 0.1 to 1000 g/10 min, preferably from about 0.1 to 200 g/10 min. The melt flow rate corresponds to the amount which is pressed within 10 minutes from a test instrument in accordance with ISO 1133 at a temperature of 230° C. and under a load of 2.16 kg. Certain applications might require different molecular weights than mentioned above and are contemplated to be included within the scope of embodiments disclosed herein.

The disclosed catalyst systems allow in particular the efficient production of stiff material (low MFR) with improved processability (increased XS and a desirable molecular weight distribution). While stiffness is an advantageous property of polymers, it also causes problems during processing. It is thus beneficial if stiff materials contain a significant amount of XS which act as a lubricant, reduces crystallinity and thus support processing. However, external donors that efficiently produce high molecular weight polymers (=low MFR), such as D-Donor, P-Donor or BUPS, also yield low XS (typically below 1 wt %). This XS cannot be reliably adjusted to higher levels due to a steep silane response of such donors (see FIG. 3). In contrast, donors like the C-Donor that allow for the adjustment of higher XS (1-5 wt %) due to a moderate silane response (see FIG. 3), are limited in their productivity towards high molecular weights. The disclosed catalyst systems including an external electron donor system comprising di(bicyclo[2.2.1]heptan-2-yl)dimethoxysilane combine for the first time excellent productivities for polymers with low MFR, a molecular weight distribution in the range from about 4 to less than 5, and high XS. Moreover, the silane response is even smoother than that of the C-Donor (see FIG. 3).

The advantageous properties provided by use of an external electron donor system comprising di(bicyclo[2.2.1]heptan-2-yl)dimethoxysilane low MFR, molecular weight distribution in the range from about 4 to less than 5, and high XS, have been found to only result in gas phase polymerizations (bulk polymerization experiments, as described below, resulted in a significantly greater MWD). Embodiments herein include a process for polymerizing propylene, the process including: contacting, in a gas phase polymerization reactor propylene, and optionally one or more comonomers, with a catalyst system comprising a Ziegler-Natta catalyst, and an external electron donor system comprising di(bicyclo[2.2.1]heptan-2-yl)dimethoxysilane to produce a propylene polymer having a molecular weight distribution in the range from about 4 to less than 5.

In some embodiments, the di(bicyclo[2.2.1]heptan-2-yl) dimethoxysilane comprises a mixture of stereoisomers. In other embodiments, the external donor system further comprises at least one external donor selected from the group consisting of silanes, ethers, esters or hindered amines. The external donor system may also include at least one external donor selected from the group consisting of dimethyldimethoxysilane, methyltrimethoxysilane, tetramethoxysilane or dicyclopentyldimethoxysilane, in some embodiments.

As noted above, embodiments of the gas phase polymerization process using an external electron donor system comprising di(bicyclo[2.2.1]heptan-2-yl)dimethoxysilane may result in a propylene polymer having a molecular weight distribution in the range from about 4 to less than 5. In other embodiments, the resulting propylene polymer may have a molecular weight distribution in the range from about 4 to less than 4.85.

As also noted above, embodiments of the gas phase polymerization process using an external electron donor system comprising di(bicyclo[2.2.1]heptan-2-yl)dimethoxysilane may produce propylene polymers having a low MFR and high XS. For example, the propylene polymer may have a MFR less than 10 dg/min and xylene solubles equal to or greater than 1 wt % in some embodiments; the propylene polymer may have a MFR less than 10 dg/min and xylene solubles equal to or greater than 1.5 wt %, 1.75 wt %, or 2.0 wt % in other embodiments.

Polymers obtainable by using the catalyst systems disclosed herein may be used advantageously in applications such as pipe, sheet, raffia, axially or biaxially oriented film, blow molding, injection stretch blow molding or thermoforming.

EXAMPLES

The invention described herein is illustrated, but not limited, by the following Examples and Comparative Runs.

Example I: Synthesis of di(bicyclo[2.2.1]heptan-2-yl)dimethoxysilane (DBDMS)

A 100 ml round bottom flask with gas inlet and magnetic stirring bar is charged with 20.0 g (159 mmol) of bicyclo[2.2.1]heptene and warmed to approx. 50° C. to melt it. 0.6 ml (approximately 0.06 mmol) of a 0.1 M solution of $H_2PtCl_6 \cdot xH_2O$ in isopropanol is added. The reaction flask is carefully evacuated three times and filled with an atmosphere of dry nitrogen and warmed to 60° C. Under vigorous stirring addition of dichlorosilane is started. Dichlorosilane addition is stopped when 12 g of dichlorosilane have been added and stirring is continued.

After flushing of the reaction flask with dry nitrogen and cooling of the reaction mixture to ambient temperatures the reaction mixture is diluted with 40 ml of diethyl ether. The resulting solution is transferred into a dropping funnel and added to a solution of 25.2 g (319 mmol) of pyridine and 10.2 g (319 mmol) of methanol in 100 ml of diethyl ether. After the addition is finished, the mixture is stirred another 30 minutes at ambient temperatures. The precipitate is filtered off and the filtrate is washed twice with deionized water and dried over anhydrous sodium or magnesium sulphate. The solvent is removed and the crude product is purified by fractional distillation in a high vacuum (b.p.: 110-112° C. @ $6 \cdot 10^{-2}$ mbar). FIGS. 1 and 2 show examples of NMR spectra of the target compound.

Example II: Polymerization Procedure

The bench scale reactor was equipped with a stirrer that can accommodate gas phase polymerizations. Testing was performed using a 5.3-liter reactor with 366 grams of propylene (plus "make-up"-see below), 0.3 ml of a 0.1M heptane solution of silane (="external donor"), 2.5 ml of 1.3M triethylaluminum (TEAl) in heptane. The amount of hydrogen was adjusted to yield the desired MFR.

The reactants were fed into the reactor in the following order: After addition of hydrogen, TEAl and silane were flushed together into the reactor using 183 grams of propylene. Another portion of 183 grams of propylene is used to flush the catalyst into the reactor at 40° C. The reactor was then heated to 75° C. over 10 minutes and maintained at this temperature for 1 h poylmerisation time. The reactor pressure was maintained at 27.6 bar at 75° C. with "make-up" propylene being added upon demand and monitored by a mass flow meter.

"Catalyst" in Example II refers to the solid components of the employed catalyst systems, comprising of magnesium/titanium/internal donor complexes, optionally supported on a suitable support like silica. Catalyst A was produced by a method similar to that described in U.S. Pat. No. 5,639,822. It is supported on silica and contains 4.1 wt % of titanium and 8.3 wt % of magnesium. Before use, approximately 0.02 grams of the catalyst powder were immersed in heptane under inert atmosphere and prepared for injection. Catalyst B was produced by a method similar to that described in US2010069586. It contains 2.0 wt % of titanium and 19.7 wt % of magnesium. Before use, approximately 0.01 grams of the catalyst powder were immersed in white oil under inert atmosphere and prepared for injection. Catalyst C was produced by a method similar to that described in U.S. Pat. No. 4,861,847. It contains 1.7 wt % of titanium and 19.8 wt % of magnesium. Before use, approximately 0.01 grams of the catalyst powder were immersed in white oil under inert atmosphere and prepared for injection.

External donors used in Example II were: the non-inventive silanes Methyl(cyclohexyl)dimethoxysilane (C-donor), diisopropyldimethoxysilane (P-donor) isobutyl (isopropyl)dimethoxysilane (BUPS), dicyclopentyldimethoxysilane (D-donor), bicyclo[2.2.1]heptan-2-yl dimethoxy-(methyl)silane (BDMMS), bicyclo[2.2.1]heptan-2-yl trimethoxysilane (BTMS) and as an example for an inventive silane di(bicyclo[2.2.1]heptan-2-yl)dimethoxysilane (DBDMS).

The physical characteristics of the polypropylene polymers produced using the various silanes were determined using the methods described below. The results obtained are summarized in Tables 1 to 6.

Activity.

The activity results reported throughout this study are based on the yielded polymer in grams per gram of catalyst per one hour polymerization (equivalent to the procedure described above).

Xylene Solubles (wt % XS).

Xylene solubles were measured using VISCOTEK's Flow Injector Polymer Analysis (FIPA) technique which is well known in the industry. VISCOTEK has published an article entitled, "FIPA for xylene soluble determination of polypropylene and impact copolymers" (which may be ordered from the VISCOTEK website, http://www.viscotek.com/applications.aspx) showing that the VISCOTEK FIPA method exhibits a 0.994 $r^2$ correlation with ASTM Method D5492-06 (equivalent to ISO 16152) over the range of 0.3% to 20% Xylene solubles. Therefore, one of ordinary skill in the art could reproduce the inventive results using either the VISCOTEK FIPA method or ASTM Method D5492-06. The weight percent of xylene solubles in the polypropylene is an indication of the stereoregulating ability of the catalyst—the higher the wt % XS, the poorer the stereoregulating ability of the catalyst.

Melt Flow Rate (MFR) Measurement.

The melt flow rate was measured in accordance with ASTM Method D 1238-04. For each 5 gram sample of polymer, 0.2 grams of a stabilizing package was added. The additive package consists of 50 wt. % IRGANOX 1010 and 50 wt. % IRGAFOS 168. Because the polymer is exposed to air at 230° C. for several minutes during the test, this package is added to inhibit thermal and oxidative degradation of the polymer. The melt flow rate provides information concerning the molecular: the higher the MFR, the lower the molecular weight of the polymer.

Melting Point ($T_m$).

$T_m$ was determined by DSC in accordance with ISO standard 3146 using a 5 mg polymer sample and applying a first heating step at a heating rate of 20° C./min up to 230° C. and a hold at 230° C. for 10 min, followed by a crystallization step with a cooling rate of 20° C./min from 200° C. to −20° C. with a hold at −20° C. of 10 min, followed by a second heating step at a heating rate of 20° C./min to 230° C. The reported melting point is the temperature, where the enthalpy of the second heating cycle displays the maximum. An instrument from METTLER TOLEDO (DSC822e) has been used after calibration with Indium under the above mentioned measurement conditions.

The Molecular Weight Distribution (MWD) was determined by a rheometric measurement, the so called Dynamic Oscillatory Rate Sweep (DORS). A sample in the form of a compression molded disk is loaded between a parallel plate-to-plate geometry. The measurements were performed in a frequency range between 0.1 and 400 rad/s. The MWD, which is calculated from the crossover modulus as follows: MWD=$10^5$ Pa/$G_c$, where $G_c$=dynamic storage modulus (G')=dynamic loss modulus (G") at the crossover frequency.

TABLE 1

Polymerization examples 1-19 with catalyst A and varying amounts of hydrogen. The examples are grouped according to the silanes used. The silanes are ordered roughly according to their tendency to produce XS (highest first), while the order within a group is based on the MFR (lowest first).

| Polymer Example | Cat. | Silane[a] | Si [ml] | $H_2$ [g] | Activity [kg/$g_{cat}$] | MFR [g/10 min] | XS [wt %] | Tm [° C.] |
|---|---|---|---|---|---|---|---|---|
| 1 | A | BTMS | 0.3 | 0.050 | 8.7 | 3.1 | 2.0 | 163.4 |
| 2 | A | BDMMS | 0.3 | 0.058 | 10.6 | 4.5 | 1.8 | 162.0 |
| 3 | A | BDMMS | 0.3 | 0.109 | 15.5 | 9.3 | 1.3 | 161.8 |
| 4 | A | C-Donor | 0.3 | 0.005 | 10.4 | 1.0 | 1.9 | 162.6 |
| 5 | A | C-Donor | 0.3 | 0.056 | 11.8 | 4.1 | 1.7 | 163.1 |
| 6 | A | C-Donor | 0.3 | 0.200 | 15.2 | 12.6 | 1.4 | 161.4 |
| 7 | A | DBDMS | 0.3 | 0.058 | 11.6 | 0.3 | 1.5 | 164.6 |
| 8 | A | DBDMS | 0.3 | 0.100 | 17.3 | 0.9 | 1.9 | 166.2 |
| 9 | A | DBDMS | 0.3 | 0.405 | 15.3 | 4.3 | 1.7 | 164.7 |
| 10 | A | DBDMS | 0.3 | 0.755 | 14.8 | 12.7 | 1.7 | 164.1 |
| 11 | A | BUPS | 0.3 | 0.050 | 18.4 | 1.0 | 0.9 | 163.4 |
| 12 | A | BUPS | 0.3 | 0.200 | 19.0 | 4.8 | 0.9 | 163.3 |
| 13 | A | BUPS | 0.3 | 0.400 | 24.1 | 11.6 | 0.7 | 162.6 |
| 14 | A | P-Donor | 0.3 | 0.050 | 14.8 | 0.7 | 0.8 | 165.3 |
| 15 | A | P-Donor | 0.3 | 0.300 | 18.9 | 5.2 | 0.7 | 163.6 |
| 16 | A | P-Donor | 0.3 | 0.501 | 19.8 | 12.3 | 0.7 | 163.2 |
| 17 | A | D-Donor | 0.3 | 0.058 | 20.5 | 1.1 | 0.4 | 165.2 |
| 18 | A | D-Donor | 0.3 | 0.405 | 17.7 | 5.6 | 0.7 | 163.1 |
| 19 | A | D-Donor | 0.3 | 0.703 | 23.5 | 11.5 | 0.9 | 163.8 |

[a]Methyl(cyclohexyl)dimethoxysilane (C-donor), diisopropyldimethoxysilane (P-donor) isobutyl(isopropyl)dimethoxysilane (BUPS) dicyclopentyldimethoxysilane (D-donor), bicyclo[2.2.1]heptan-2-yldimethoxy(methyl)silane (BDMMS), bicyclo[2.2.1]heptan-2-yl-trimethoxysilane (BTMS) and di(bicyclo[2.2.1]heptan-2-yl)dimethoxysilane (DBDMS).

We have thus found that the external donors described herein, such as DBDMS, produce polymers with low MFR (<10) with an activity comparable to well-known benchmarks, such as D-Donor, BUPS and P-Donor, but with a significantly higher amount of XS. Polymers with a similarly high amount of XS and low MFR cannot be obtained with the C-Donor without massive loss of activity.

The silane response of selected donors with catalyst A is represented in FIG. 3. Polymer examples 20-42 were synthesized according to Example II with 0.05 mL $H_2$, but with varying amounts of external donor. FIG. 3 emphasizes the fact that donors such as the D-Donor show a steep silane response, rendering reliable XS adjustment impossible. The C-Donor allows for a much better adjustment, due to a moderate response. DBDMS shows an even smoother response, thus allowing for reliable control of the industrial process.

TABLE 2

Polymerization examples 43-46 with catalyst B. The examples are grouped according to the silanes used.

| Polymer Example | Cat. | Silane | Si [ml] | $H_2$ [g] | Activity [kg/$g_{cat}$] | MFR [g/10 min] | XS [wt %] | Tm [° C.] |
|---|---|---|---|---|---|---|---|---|
| 43 | B | C-Donor | 0.3 | 0.01 | 21.7 | 1.0 | 1.8 | 160.4 |
| 44 | B | C-Donor | 0.3 | 0.1 | 32.7 | 6.4 | 1.8 | 161.1 |
| 45 | B | DBDMS | 0.3 | 0.1 | 38.7 | 1.5 | 1.8 | 165.2 |
| 46 | B | DBDMS | 0.3 | 0.4 | 34.6 | 5.8 | 1.5 | 163.3 |

The results in Table 2 confirm, that the described advantageous effects of DBDMS are not limited to one specific catalyst.

TABLE 3

Polymerization examples 47-50 with catalyst C. The examples are grouped according to the silanes used.

| Polymer Example | Cat. | Silane | Si [ml] | $H_2$ [g] | Activity [kg/$g_{cat}$] | MFR [g/10 min] | XS [wt %] | Tm [° C.] |
|---|---|---|---|---|---|---|---|---|
| 47 | C | C-Donor | 0.3 | 0.01 | 19.3 | 1.1 | 1.7 | 160.8 |
| 48 | C | C-Donor | 0.3 | 0.1 | 31.3 | 6.5 | 1.6 | 161.8 |
| 49 | c | DBDMS | 0.3 | 0.1 | 35.8 | 1.0 | 1.5 | 163.0 |
| 50 | c | DBDMS | 0.3 | 0.4 | 34.2 | 5.3 | 1.6 | 164.3 |

The results in Table 3 confirm that the described advantageous effects of DBDMS are not limited to one specific catalyst.

TABLE 4

Polymerization examples with low MFR (~1)

| Polymer Example | Cat. | Silane[a] | Si [ml] | $H_2$ [g] | Activity [kg/$g_{cat}$] | MFR [g/10 min] | XS [wt %] | Tm [° C.] |
|---|---|---|---|---|---|---|---|---|
| 4 | A | C-Donor | 0.3 | 0.005 | 10.4 | 1.0 | 1.9 | 162.6 |
| 8 | A | DBDMS | 0.3 | 0.100 | 17.3 | 0.9 | 1.9 | 166.2 |
| 11 | A | BUPS | 0.3 | 0.050 | 18.4 | 1.0 | 0.9 | 163.4 |
| 14 | A | P-Donor | 0.3 | 0.050 | 14.8 | 0.7 | 0.8 | 165.3 |
| 17 | A | D-Donor | 0.3 | 0.058 | 20.5 | 1.1 | 0.4 | 165.2 |
| 43 | B | C-Donor | 0.3 | 0.01 | 21.7 | 1.0 | 1.8 | 160.4 |
| 45 | B | DBDMS | 0.3 | 0.1 | 38.7 | 1.5 | 1.8 | 165.2 |
| 47 | C | C-Donor | 0.3 | 0.01 | 19.3 | 1.1 | 1.7 | 160.8 |
| 49 | C | DBDMS | 0.3 | 0.1 | 35.8 | 1.0 | 1.5 | 163.0 |

The results in Table 4 emphasize the superior activity of DBDMS compared to the C-Donor at low MFR (~1) while maintaining a considerable amount of XS. D-Donor, BUPS and P-Donor may match the productivity of DBDMS but produce less than 1% XS.

TABLE 5

Polymerization examples with low MFR (~5)

| Polymer Example | Cat. | Silane[a] | Si [ml] | $H_2$ [g] | Activity [kg/$g_{cat}$] | MFR [g/10 min] | XS [wt %] | Tm [° C.] |
|---|---|---|---|---|---|---|---|---|
| 1 | A | BTMS | 0.3 | 0.050 | 8.7 | 3.1 | 2.0 | 163.4 |
| 2 | A | BDMMS | 0.3 | 0.058 | 10.6 | 4.5 | 1.8 | 162.0 |
| 5 | A | C-Donor | 0.3 | 0.056 | 11.8 | 4.1 | 1.7 | 163.1 |
| 9 | A | DBDMS | 0.3 | 0.405 | 15.3 | 4.3 | 1.7 | 164.7 |
| 12 | A | BUPS | 0.3 | 0.200 | 19.0 | 4.8 | 0.9 | 163.3 |
| 15 | A | P-Donor | 0.3 | 0.300 | 18.9 | 5.2 | 0.7 | 163.6 |
| 18 | A | D-Donor | 0.3 | 0.405 | 17.7 | 5.6 | 0.7 | 163.1 |
| 44 | B | C-Donor | 0.3 | 0.1 | 32.7 | 6.4 | 1.8 | 161.1 |
| 46 | B | DBDMS | 0.3 | 0.4 | 34.6 | 5.8 | 1.5 | 163.3 |
| 48 | C | C-Donor | 0.3 | 0.1 | 31.3 | 6.5 | 1.6 | 161.8 |
| 50 | C | DBDMS | 0.3 | 0.4 | 34.2 | 5.3 | 1.6 | 164.3 |

The results in Table 5 emphasize the conclusions drawn from Table 4. Notably, the silanes with only one bicyclo[2.2.1]heptan-2-yl substituent (BTMS and BDMMS) do not reflect the advantages of DBDMS.

TABLE 6

Polymerization examples with medium MFR (~11)

| Polymer Example | Cat. | Silane[a] | Si [ml] | $H_2$ [g] | Activity [kg/$g_{cat}$] | MFR [g/10 min] | XS [wt %] | Tm [° C.] |
|---|---|---|---|---|---|---|---|---|
| 3 | A | BDMMS | 0.3 | 0.109 | 15.5 | 9.3 | 1.3 | 161.8 |
| 6 | A | C-Donor | 0.3 | 0.200 | 15.2 | 12.6 | 1.4 | 161.4 |
| 10 | A | DBDMS | 0.3 | 0.755 | 14.8 | 12.7 | 1.7 | 164.1 |
| 13 | A | BUPS | 0.3 | 0.400 | 24.1 | 11.6 | 0.7 | 162.6 |
| 16 | A | P-Donor | 0.3 | 0.501 | 19.8 | 12.3 | 0.7 | 163.2 |
| 19 | A | D-Donor | 0.3 | 0.703 | 23.5 | 11.5 | 0.9 | 163.8 |

The results in Table 6 show that DBDMS maintains higher XS than other bulky donors at medium MFR.

WO97/30096 (Exxon) discloses the use of various silane electron donors in bulk polymerizations, the silane electron donors including dinorbornyldimethoxysilane (DNMS), methylcyclohexyldimethoxysilane (MCMS), and dicyclopentyldimethoxysilane (DCPMS). As noted in Table II of that publication, the molecular weight distributions achieved with DNMS was in the range from 5 to 6, and that for MCMS and DCPMS was in the range from 4 to 5.

Bulk phase and gas phase polymerizations were conducted to verify these results. The bulk phase reactions were performed similar to those as described in the WO97/30096 publication. The gas phase reactions were performed similar to the polymerization experiments described above.

The experimental results for the gas phase and bulk polymerizations using DCPMS and MCMS are shown in the table below. Bulk polymerization results for DNMS are also shown.

| Donor | Phase | Si (ml) | Activity (kg/$g_{cat}$) | MFR (g/10 min) | XS (wt %) | MWD |
|---|---|---|---|---|---|---|
| DCPMS | Bulk | 2.00 | 22.8 | 4.3 | 1.7 | 4.4 |
| DCPMS | Gas | 0.3 | 16.4 | 0.5 | 0.7 | 4.3 |
| MCMS | Bulk | 2.00 | 15.0 | 12.4 | 2.4 | 4.5 |
| MCMS | Gas | 0.3 | 14.6 | 3.3 | 1.7 | 4.5 |
| DNMS | Bulk | 2.00 | 17.9 | 6.0 | 2.2 | 6.0 |

The above results illustrate that a similar MWD may be expected for polymers produced, regardless of whether the reaction is performed in the gas phase or bulk. The above results also confirm the ranges presented in the WO publication (it is noted that the test methods, while not identical, provide comparable results).

Surprisingly, however, it was found that the molecular weight distribution for DNMS (a.k.a. di(bicyclo[2.2.1]heptan-2-yl)dimethoxysilane) for gas phase polymerizations was dramatically different, as shown in the table below.

| Donor | Phase | Si (ml) | Activity (kg/$g_{cat}$) | MFR (g/10 min) | XS (wt %) | MWD |
|---|---|---|---|---|---|---|
| DBDMS | Gas | 0.3 | 15.3 | 6.3 | 1.9 | 4.8 |

Gas phase polymerization of propylene with DBDMS may thus provide for polymers having a molecular weight distribution less than 5, which is not anticipated based on prior results. The lower molecular weight distribution provided by the gas phase polymerization may thus be more desirable, as having a "drop-in" processability (i.e., similar MWD to currently preferred polymers), along with advantages as discussed above, including higher activity at lower MFR's and having relatively high XS content.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for polymerizing propylene, the process comprising
   contacting, in a gas phase polymerization reactor
     propylene, and
     optionally one or more comonomers,
   with a catalyst system comprising
     a Ziegler-Matta catalyst, and
     an external electron donor system comprising di(bicyclo[2.2.1]heptan-2-yl)dimethoxysilane
   to produce a propylene polymer having a molecular weight distribution in the range from about 4 to less than 5.

2. The process of claim 1, wherein the di(bicyclo[2.2.1]heptan-2-yl)dimethoxysilane comprises a mixture of stereoisomers.

3. The process of claim 1, wherein the external electron donor system further comprises at least one external electron donor selected from the group consisting of silanes, ethers, esters or hindered amines.

4. The process of claim 1, wherein the external electron donor system further comprises at least one external electron donor selected from the group consisting of dimethyldimethoxysilane, methyltrimethoxysilane, tetramethoxysilane or dicyclopentyldimethoxysilane.

5. The process of claim 1, the propylene polymer has a molecular weight distribution in the range from about 4 to less than 4.85.

6. The process of claim 1, wherein the propylene polymer has a MFR less than 10 dg/min and xylene solubles equal to or greater than 1 wt %.

7. The process of claim 1, wherein the propylene polymer has a MFR less than 10 d/min and xylene solubles equal to or greater than 1.5 wt %.

8. The process of claim 1, further comprising admixing the di(bicyclo[2.2.1]heptan-2-yl)dimethoxysilane with the Ziegler-Natta catalyst and a co-catalyst to for the catalyst system.

9. The process of claim 1, wherein the comonomer comprises at least one of ethylene, butene, pentene, hexene, and octene.

* * * * *